Oct. 7, 1941.  D. FIRTH ET AL  2,258,486
OIL CARBURETOR
Filed Dec. 6, 1939   9 Sheets-Sheet 3

Inventors:
David Firth and
John E. Storer, Jr.
By Edward C. Gritzbaugh
Atty.

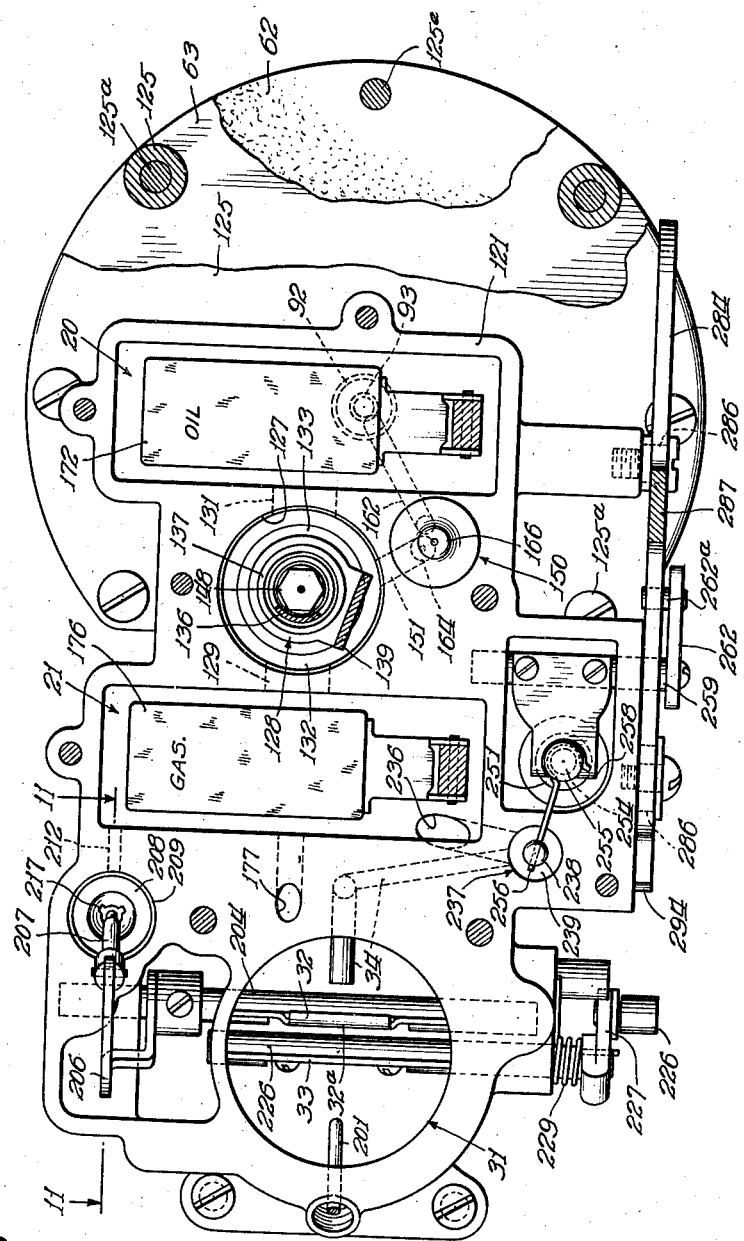

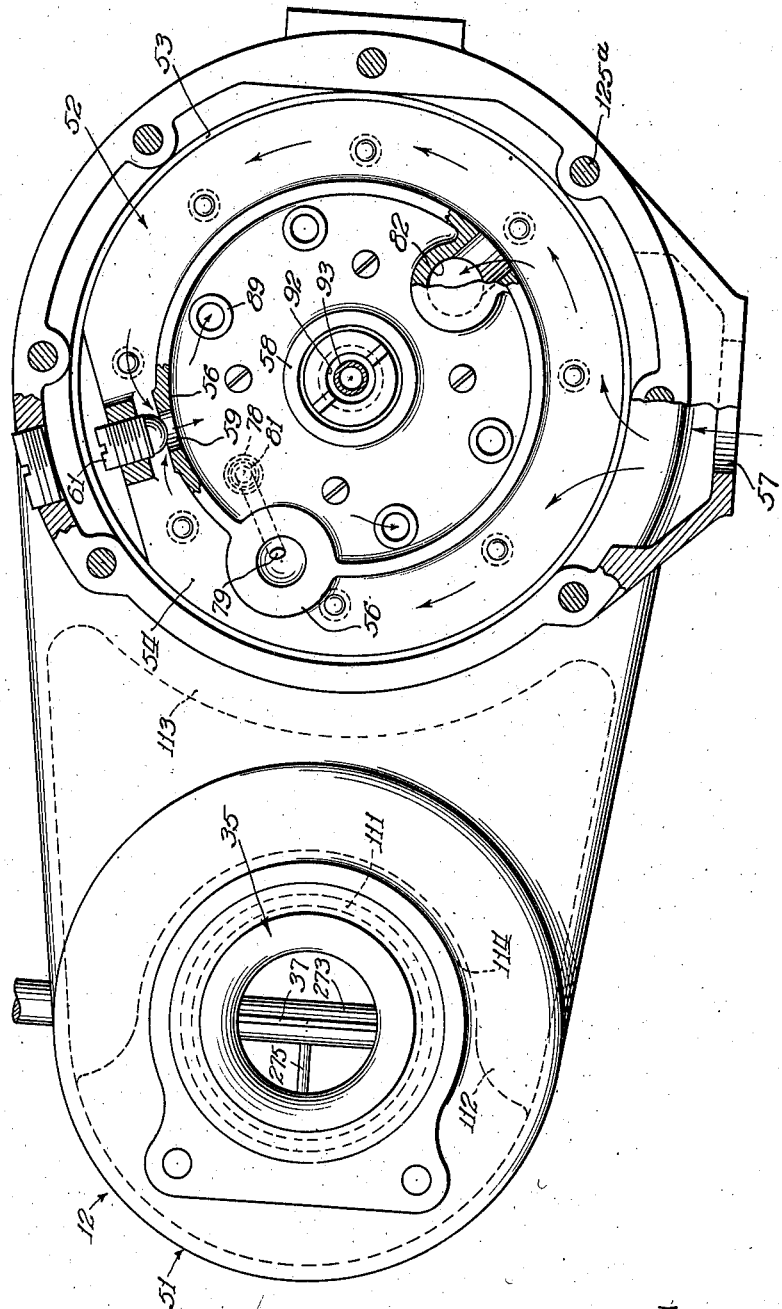

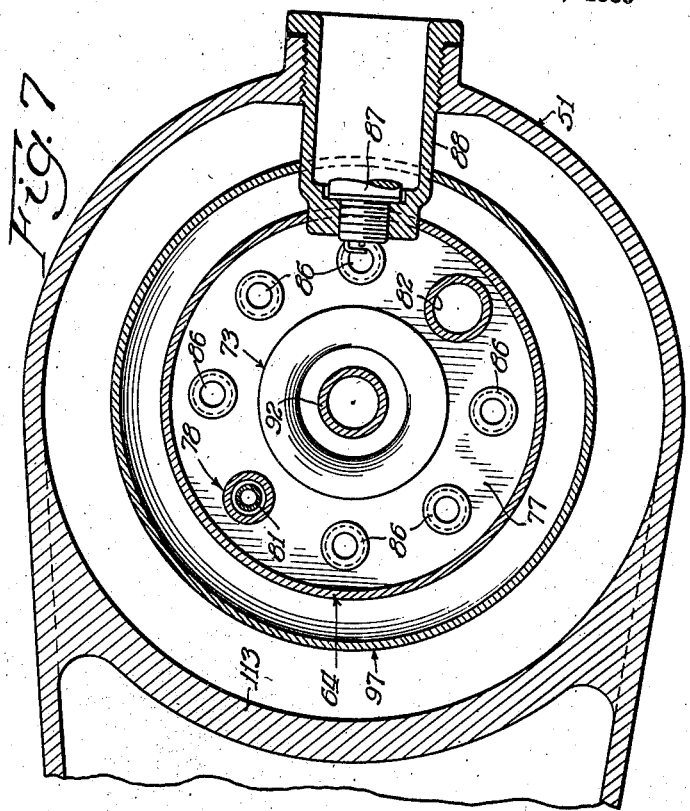
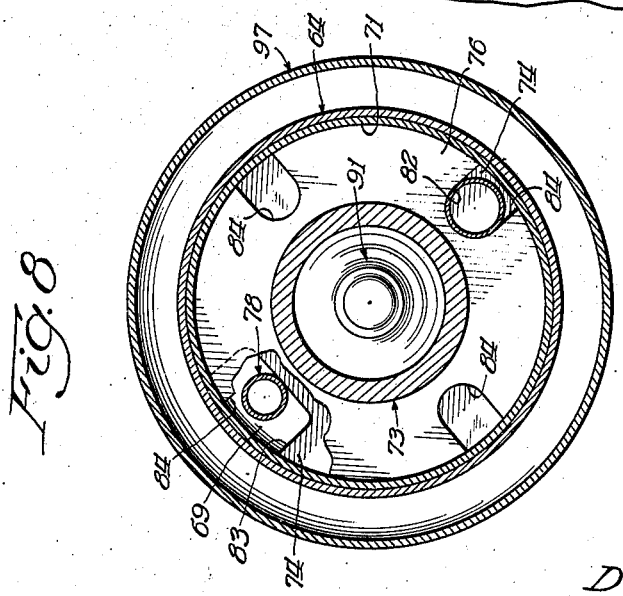

Oct. 7, 1941.  D. FIRTH ET AL  2,258,486
OIL CARBURETOR
Filed Dec. 6, 1939  9 Sheets-Sheet 7

Inventors:
David Firth and
John E. Storer, Jr.
By: Edward C. Gritzbaugh
Atty.

Oct. 7, 1941.  D. FIRTH ET AL  2,258,486
OIL CARBURETOR
Filed Dec. 6, 1939  9 Sheets-Sheet 8
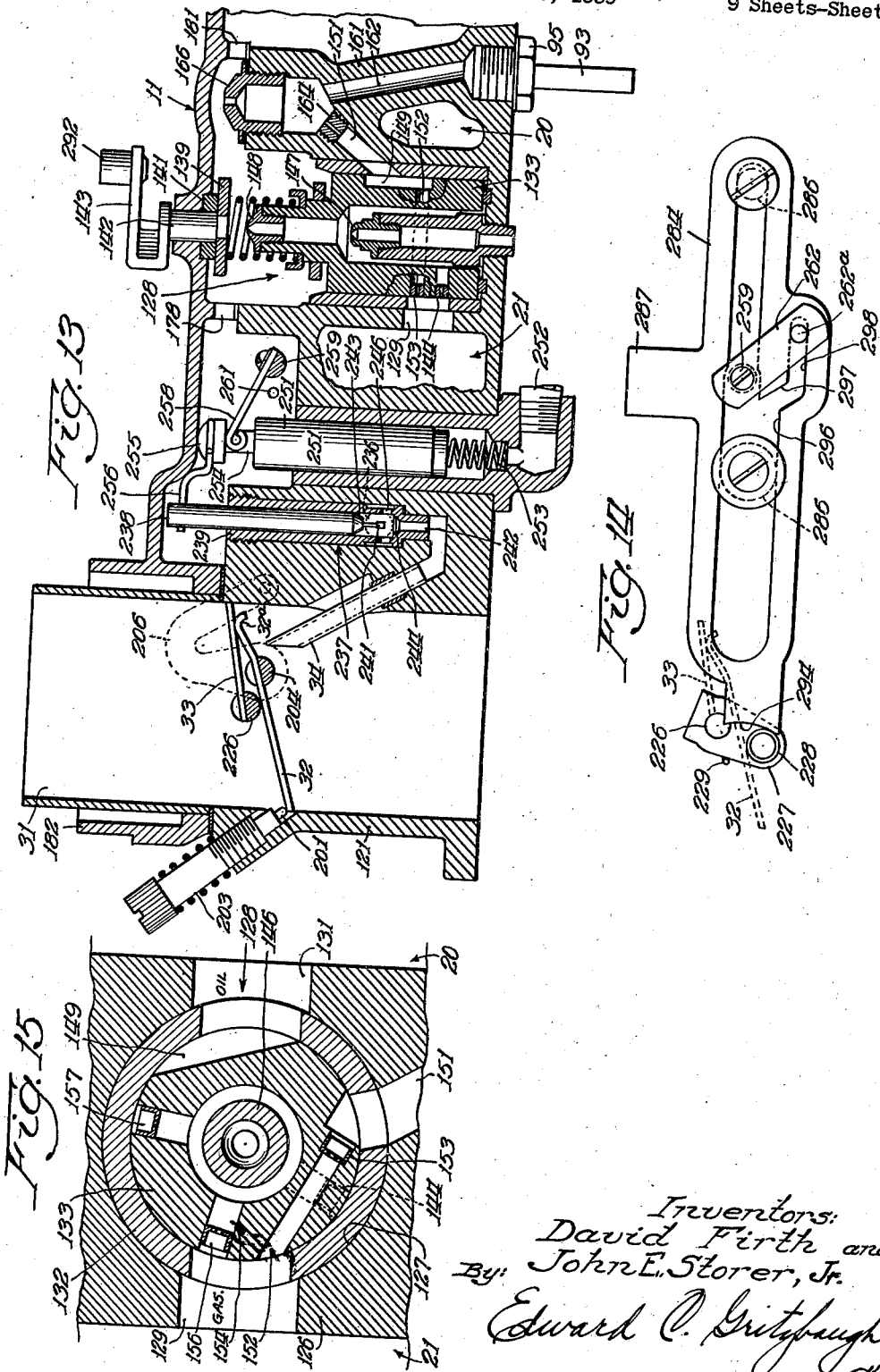
Inventors:
David Firth and
John E. Storer, Jr.
By: Edward C. Gritzbaugh
Atty.

Oct. 7, 1941.  D. FIRTH ET AL  2,258,486
OIL CARBURETOR
Filed Dec. 6, 1939  9 Sheets-Sheet 9
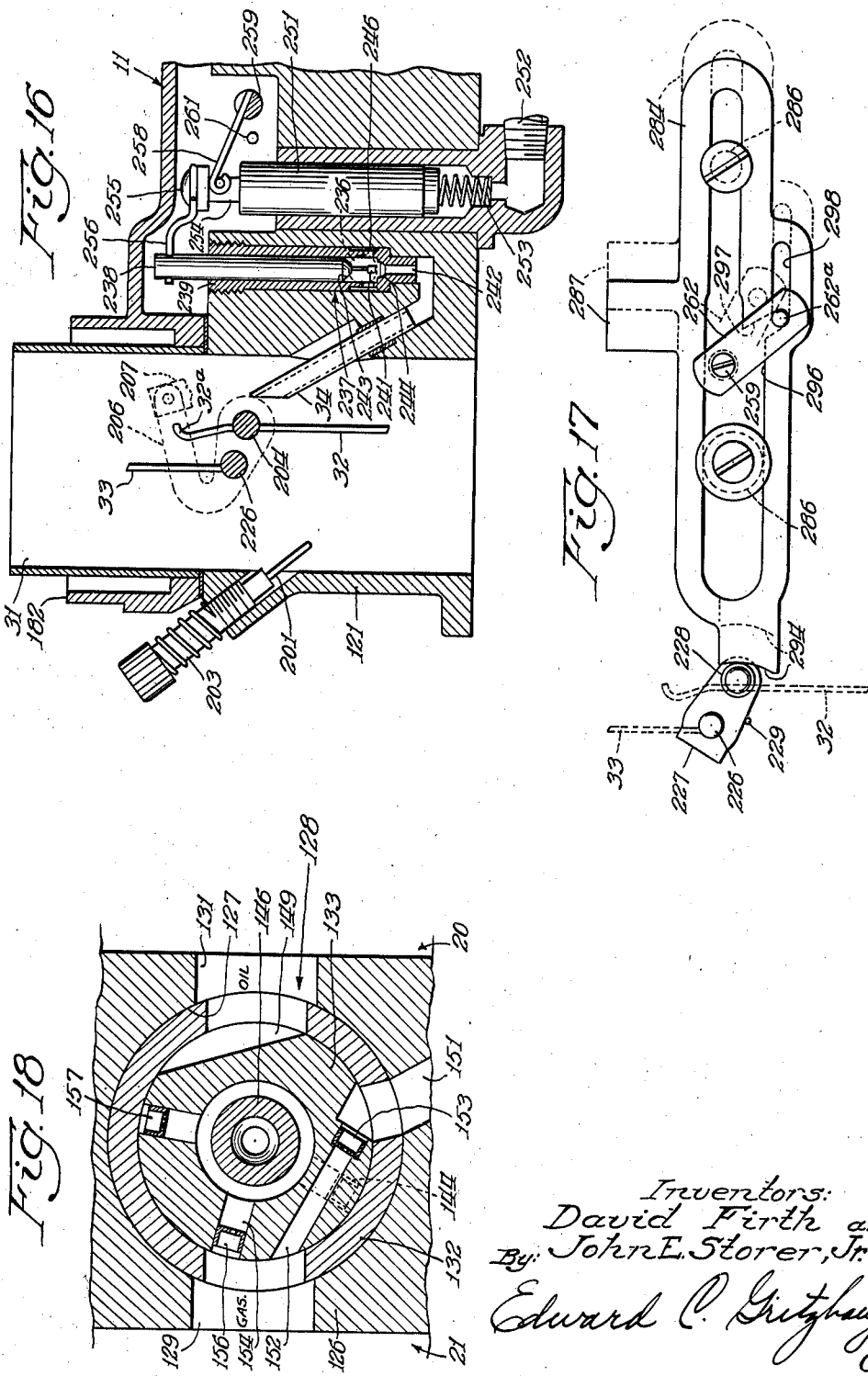
Inventors:
David Firth and
By: John E. Storer, Jr.
Edward C. Gritzbaugh
Atty.

Patented Oct. 7, 1941

2,258,486

UNITED STATES PATENT OFFICE 2,258,486

OIL CARBURETOR

David Firth and John E. Storer, Jr., Flint, Mich., assignors, by mesne assignments, to Enoch Rector, New York, N. Y.

Application December 6, 1939, Serial No. 307,724

12 Claims. (Cl. 48—107)

This invention relates to fuel conditioning and charge forming devices adapted for use in connection with internal combustion engines, and particularly to a device of this type capable of converting to fixed gases relatively heavy hydrocarbon oils of a type ordinarily considered difficult or incapable of use in an unmodified Otto-Cycle internal combustion engine, and performing this conditioning operation incident to the consumption of the resulting gases as fuel in such an engine.

We are aware that previous attempts have been made to convert relatively heavy hydrocarbon oils to fixed gases by partial combustion of the lighter ends in a limited supply of air, but to our knowledge none of these previous arrangements have met with the success that the present invention is now enjoying.

We have discovered and incorporated in the present disclosure certain critical method steps, together with structural means particularly designed for carrying out these steps which have been proven by exhaustive tests and successful operation to make the difference between success and failure.

It is an object of this invention to provide a practical and successful method of converting relatively heavy hydrocarbon oils to a lighter and more combustible fuel by partial combustion of the lighter ends of said oil in a limited supply of air.

It is an object to provide an improved apparatus for converting relatively heavy hydrocarbon oils into more volatile and highly combustible fixed gases, substantially free of uncombined carbon.

It is a more particular object to provide an improved apparatus for cracking relatively heavy hydrocarbon oils in the liquid form, such for example, as fuel oil by partial combustion of the lighter ends of the oil in a limited supply of air to thereby produce fixed gases, such apparatus being particularly designed for cooperation with an internal combustion engine wherein the suction created by said engine is effective to control the flow through said apparatus.

The fuels primarily intended to be made usable by this treatment are the fuel oils, furnace oils, burning oils, Diesel oils, tractor oils, etc., hereafter called oils. However, it is within the contemplation of this invention to employ other fuels that may be suitable for use in the device where characteristics preventing direct carburetion thereof render the same undesirable in previously known devices. Among these may be found certain gasolines of poor quality with reference to detonation or octane number, and possibly the kerosenes. There may be other fuels of petroleum or other derivations which the device will prepare for operation in the Otto-Cycle (or other internal combustion engines normally using gasoline or similar fuels), which fuels would not otherwise be usable in such engines.

Among the more specific objects of the present invention are the following:

The provision of an improved burner pot construction providing for ready assembly and disassembly;

The provision of an improved anti-coking means for delivering fuel through the flame zone and raising the temperature thereof without the delivery means becoming choked by coke deposits;

The provision of an improved outer pot construction providing better conduction and distribution of the gases delivered from the converter to the charge forming passage;

The provision of an improved baffle arrangement for effecting a more even distribution of the fixed gases as they are delivered to the charge forming passage;

The provision of an improved arrangement of Venturi member and hot gas inlet port functioning to reduce the refrigerating effect and consequent cold deposits on the venturi heretofore present;

The provision of an improved arrangement for enriching the fuel charge under special conditions; and The provision of a special arrangement of air valve means for controlling the air ratio including the provision of means to prevent the sudden increase of the air supply.

Also included among the special objects is the provision of a novel arrangement for changing from warm-up operation on gasoline to a normal running operation on the gaseous products of the converter, the latter being supplemented under special conditions only by the introduction of an enriching charge of gasoline.

Still another specific object is the provision of a special arrangement of converter and fuel reservoir including mounting the reservoir on the top of the converter and providing for the efficient removal of both oil and gasoline in the desired proportions determined by the varying inlet suctions adapted to be applied by the engine to the discharge connection of the charge forming passage.

Other more particular objects, advantages and uses of my invention will become apparent from a reading of the following specification taken in connection with the accompanying drawings wherein:

Fig. 2a is a broken-away vertical cross-sectional view of the enriching assembly showing the vacuum piston in the position it occupies when the vacuum below the throttle is above a predetermined value, thus holding the vacuum piston in its lowered position and causing the metering plug to completely shut off the flow of fluid thereby.

Fig. 5 is a broken away plan view taken substantially on the line 5—5 of Fig. 2 showing to particular advantage the arrangement of passages leading from the gas and oil reservoirs to the points of distribution.

Fig. 6 is a broken away plan view partially in section taken substantially on the line 6—6 of Fig. 2, and showing to particular advantage certain of the converter structure including the threaded metering plug controlling the air inlet port for measuring the critical supply of air introduced into the converter;

Fig. 7 is a plan view in section taken substantially on the line 7—7 of Fig. 2 bringing out the inner construction of the flame chamber and the distribution of burner members therein as well as heater conduits passing therethrough;

Fig. 8 is a plan view in section taken substantially on the line 8—8 of Fig. 2 showing to advantage the relationship of baffle plates and conduits defining the circuitous path for mixing burner gasoline and air and leading the same to the under side of the burners;

Fig. 13 is a broken-away vertical sectional view corresponding to a portion of Fig. 2, but somewhat enlarged and showing the parts in the positions they occupy for starting or warm-up operation entirely on gasoline with the air valve and choke valve in closed or choking position;

Fig. 14 is an elevation view of the slide member of the control linkage mechanism indicated in the position that it occupies for closing the air choke valve as well as lifting the metering pin as shown in Fig. 13 for starting;

Fig. 15 is a horizontal cross-section through the change-over valve assembly showing the valve in position for conducting gasoline only to the converter, and completely cutting off the oil supply for operation as shown in Fig. 13;

Fig. 16 is a view similar to that shown in Fig. 13, but indicating the air and choke valve in fully open position, the operation still being completely on gasoline for warm-up purposes the engine having been started and the choke valve released;

Fig. 17 is an elevation view of the slide member of the control linkage showing the position when operating on gasoline with the air and choke valve in full open position; and Fig. 18 is a horizontal cross-sectional view showing the position of change-over valve member corresponding to Fig. 16.

Figure 1:
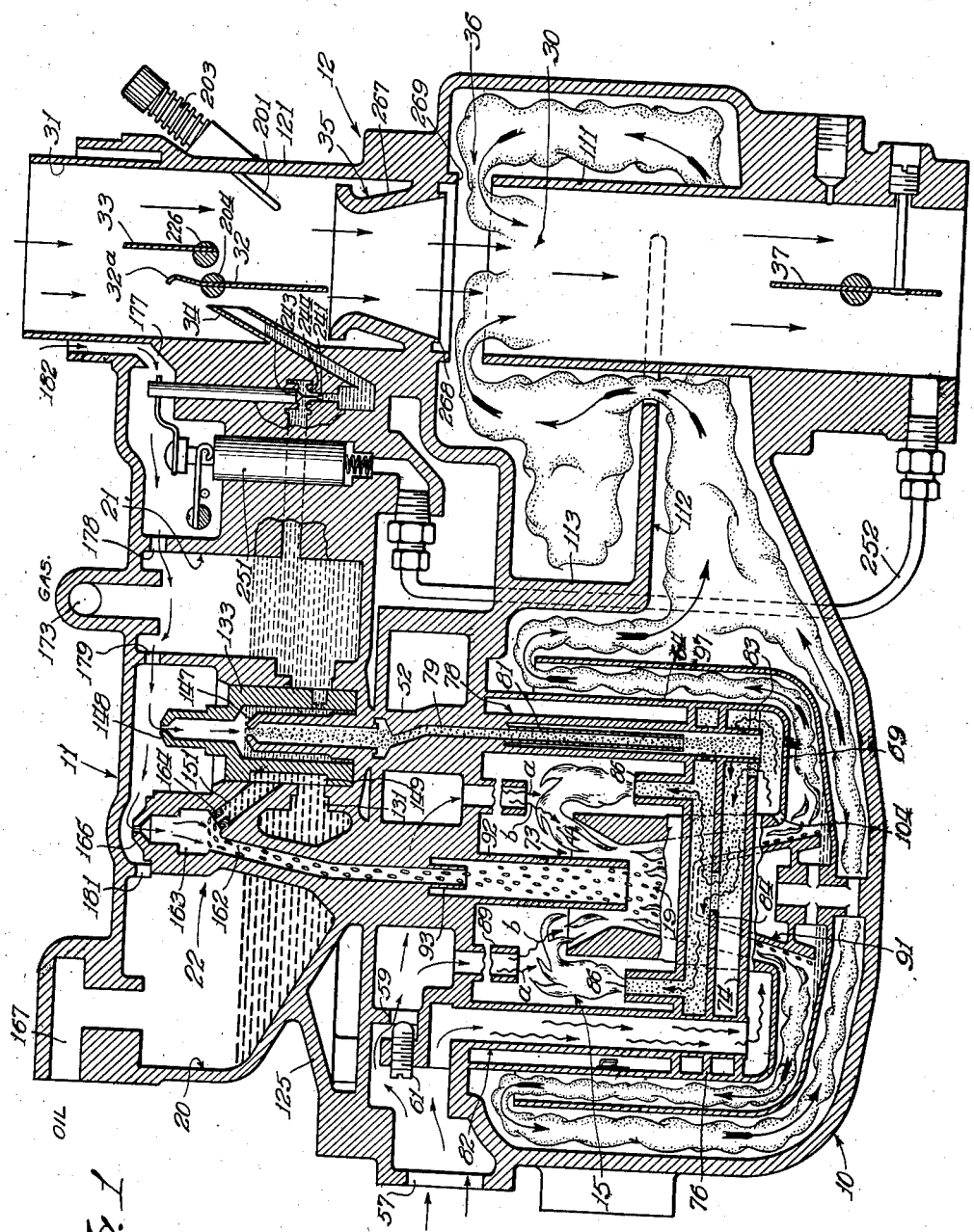
Fig. 1 is a pictorial or schematic cross-section view through a preferred embodiment and showing to advantage the various paths of flow of air, oil and gasoline indicating approximate place of transition from oil to fixed gases, bringing out to advantage the novel features of operation, the parts being indicated in the position they occupy when operating on oil and gasoline.

For a general understanding of the present invention, reference is made to Fig. 1 showing a pictorial schematic cross-section through a preferred embodiment which includes essentially a converter assembly indicated generally at 10, for changing heavy hydrocarbon oil to fixed gases, a reservoir assembly indicated generally at 11 for supplying oil as well as a more volatile fuel, such as gasoline to converter 10, and a charge forming assembly indicated generally at 12 for mixing the gaseous products from converter 10 with the proper proportion of air and under certain circumstances with an enriching charge of a more volatile fuel such as gasoline, the resulting fuel charge being then in condition to be drawn into an internal combustion engine (not shown) as the fuel therefor.

The converter 10 comprises essentially a burner or flame chamber indicated generally at 15 wherein a plurality of burners preferably fed by gasoline or other relatively volatile fuel together with air function to raise the temperature to about 1500° F., and a conditioning or cracking chamber indicated generally at 19 into which oil is introduced together with the hot gases from the flame chamber 15, which gases are made (in a novel manner to be described) to include in addition to the inert gases of combustion a predetermined proportion of excess air which becomes effective to support combustion of the lighter ends of the oil and thus additionally raise the temperature to about 800° F. to 1300° F. in the cracking chamber 19, depending upon the amount of secondary air admitted, which temperature is sufficiently high to cause the remaining heavy fraction to be converted into fixed gases, which gases are then conducted over a special arrangement of baffles to the fuel charge forming assembly 12.

The reservoir assembly 11 comprises essentially an oil float chamber 20 and a gasoline float chamber 21 separated by a partition construction with a special arrangement of passages and including a novel distributor arrangement referred to generally at 22 for selectively removing gasoline and oil, emulsifying the same with air and delivering the same to the converter in response to the suction to be applied to the carburetor outlet, as modified or adapted at charge forming assembly 12, a particular feature of this distributor being the fact that an air bleed is provided for admitting the emulsifying air which is also effective to break the flow upon the cut off of manifold suction to thereby prevent inadvertent syphoning.

The charge forming assembly 12 comprises essentially a charge forming passage indicated generally at 30, (and defined in part by) an air inlet conduit 31, under the control of valves 32, 33 in turn controlled by a special mechanism to be described, enriching nozzle 34 for supplying an enriching charge of gasoline under the control of a special arrangement of means to be described responsive to vacuum conditions below the throttle, and a special Venturi arrangement indicated generally at 35, together with a special tubular conduit construction defining an anti-refrigerating port indicated generally at 36 for admitting gases from convereter 10 into the fuel charge forming assembly 12, and a throttle 37 for controlling the delivery from the charge forming assembly.

*Detailed description of converter*

Figure 2:
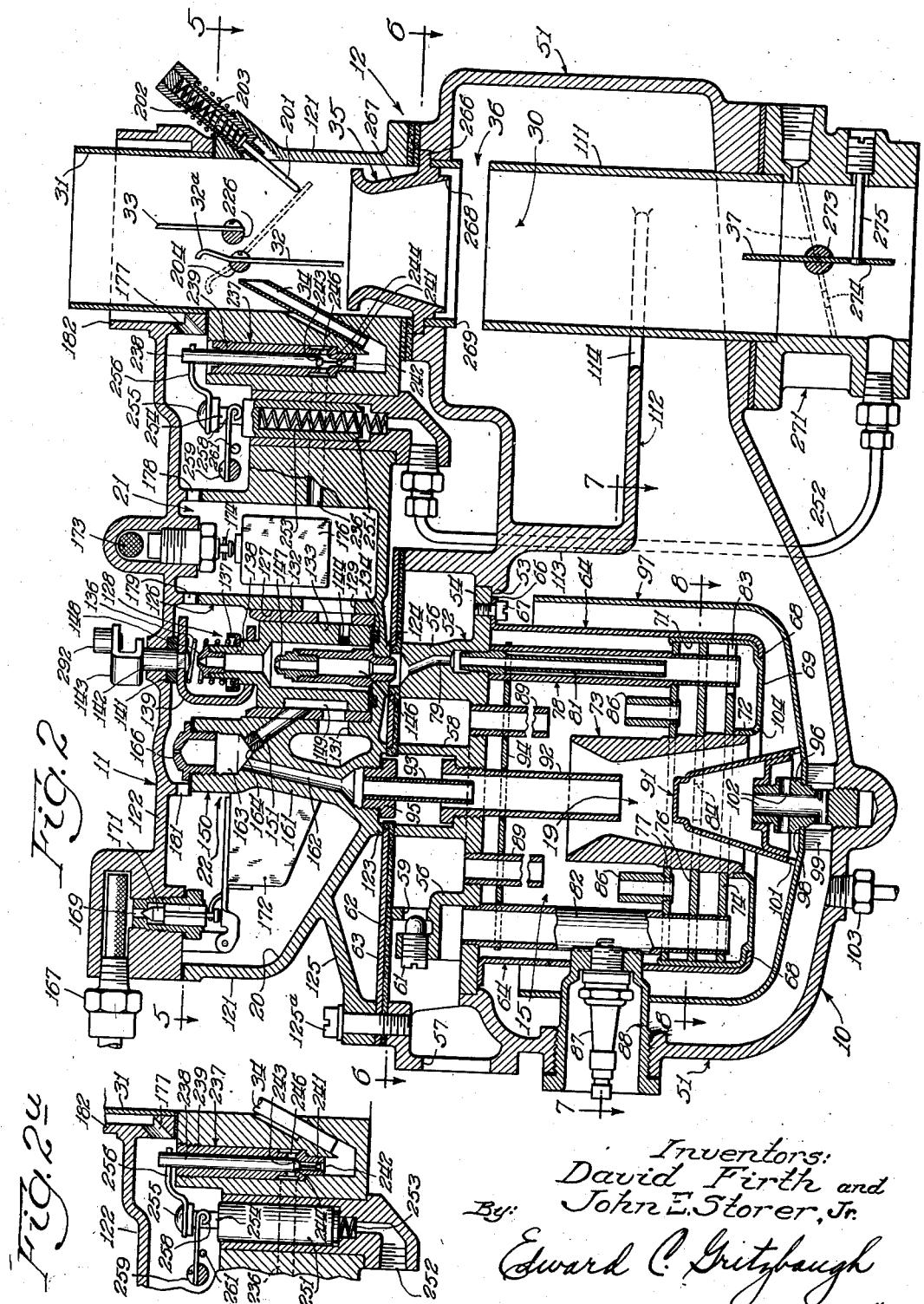
Fig. 2 is a vertical sectional view corresponding to Fig. 1, but bringing out to advantage the assembled relationship of the novel features of construction.

Referring in greater detail to Fig. 2, the converter comprises a generally bowl-shaped main housing 51, preferably a casting, provided with a readily removable cover or partition assembly 52. Main housing 51 is formed with radially inwardly extending shoulder 53 on which is supported the peripheral edge of the bottom substantially horizontal wall 54 of cover assembly 52. Extending upwardly from horizontal wall portion 54 is a circular wall 56 spaced radially inwardly of the periphery of wall 54, and defining with the upper portion of the main housing wall an annular space for the circulation of air from a port 57 formed in the main housing wall. Inwardly of wall 56 there is a second vertical circular wall 58, serving with wall 56 to define a second annular space for the circulation of air admitted in predetermined quantities through a port 59 under the control of a threaded metering plug 61 in a manner and for a purpose later to be described in detail. Each of the above vertical walls extend to the same height and a cover 62 in the form of a sheet of asbestos or other insulating material is placed thereon in sealed contact with the upper surfaces of each wall. Positioned above this insulator sheet is a relatively thin cover plate 63 preferably of metal. This arrangement of air circulation passages and insulated cover has particular significance with reference to protecting the fuel bowl from excess heat as will appear later.

The detailed structure forming the flame chamber 15 and the conditioning or cracking chamber 19 is suspended from horizontal wall 54 of cover member 52 for ready removal therewith as a unit. A generally circular inner pot or hanger member 64, preferably of sheet metal, is formed about its upper periphery with a radially outwardly extending flange 66 for attachment to horizontal wall 54 as by screws 67 and formed adjacent the lower open end thereof with radially inwardly extending supporting flange 68. Received within the lower portion of hanger 64 in supported relation on flange 68 is a base or bottom member 69 having a vertical outer side wall 71 nested within hanger 64, and upturned inner wall 72 of lesser vertical extent receiving and supporting a Venturi member 73. Nested between the wall 71 and venturi 73 are a plurality of orificed baffle plates 74, 76 and 77, the function of which is to cause the air and burner fuel to follow a circuitous path to effect thorough mixing as will appear (see also Figs. 7 and 8).

A special conduit arrangement 78 extends from a point below baffle 74 up through baffle 76, baffle 77 and through flame chamber 15 and connects with a passage 79 formed in vertical wall 56 of the cover member which in turn communicates with a distributor for removing gasoline to a point below baffle 74, as will appear. Conduit 78 is particularly characterized by the provision of an inner conduit 81, thus providing for only a limited amount of heat reaching the gasoline passing down through conduit 81, thus preventing the same from becoming sufficiently heated to cause coking within the conduit at the temperature at which the flame chamber 15 is operated.

A conduit 82 for primary burner air extends up through the baffle plates from below baffle plate 74 at a diametrically opposite position from fuel conduit 78 and communicates at its upper end with an opening formed in horizontal wall 54 for admitting air from port 57, heating and passing the same to a point below baffle 74 where it is brought into communication with the heated gasoline from conduit 78 (see also Figs. 6, 7 and 8). An elongated slot 83 is formed in baffle plate 74 about the lower end of conduit 78 for conveying the mixture up between baffles 74 and 76. Diametrically opposed elongated slots 84 in baffle plate 76 displaced at substantially 90° from slot 83 permit the circuitous passage of the mixture thereabove and to the lower inlet ends of a plurality of burner nipples 86 mounted in upper baffle plate 77, six burners being used in the present installation. This circuitous path is effective to cause more perfect mixing and uniform distribution of the air and gasoline as well as to enable the same to pick up more heat. For initiating the burner operation, we prefer to employ a spark plug 87 having a suitable supply of electric potential (not indicated), mounted in an adapter or housing 88 threadably mounted in the main housing wall 51 and extending through an opening in the hanger wall 64 and presenting the spark forming terminals in proximity to the upper end of one of the burners 86 for igniting the same.

We have found that the air that can be satisfactorily emulsified with the burner fuel conveyed to burner 86 is not sufficient to produce complete combustion of this fuel and we, therefore, provide means for introducing definitely controlled quantities of a secondary supply of air to the burner chamber. This is accomplished by metering an auxiliary stream of air through port 59 under the control of threaded metering plug 61 and thence through depending nipples 89 threadably mounted in openings formed in horizontal wall 54 between vertical walls 56 and 58. As will be made more apparent later in the detailed description of operation, air is admitted through port 59 in excess of that required to effect complete combustion of the burner fuel, which excess air is heated and conveyed to the cracking chamber 19 to support combustion of the lighter ends of the oil to be converted therein.

The oil cracking or gasifying chamber or zone 19 is defined principally by the inner portion of the venturi 73 below the throat, the inner portion of the bottom member 69 and the spreader member 91. However, there is no sharply drawn line as to just where the gasifying operation begins and ends.

Oil to be treated in conditioning chamber 19 is introduced through a conduit member 92, the upper end of which is threadably mounted in an opening formed in wall 54 within the space defined by vertical wall 58, and the lower end thereof extends downwardly within Venturi member 73 to a point below the throat thereof. In order to prevent coking, the oil is introduced into conduit 92 by means of a second smaller conduit 93 depending from a threaded adapter 95 forming part of the reservoir assembly as will appear.

As an additional insulating measure there is provided a ceiling baffle plate 94 spaced from the horizontal wall 54 and supported in any suitable manner such for example as by a tight fit with certain of the tubular members passing therethrough. It will thus be seen that by first removing the spark plug housing 88 and the reservoir assembly that cover member 52 with the entire burner chamber assembly suspended therefrom can be readily removed as a unit for inspection and adjustment. Similarly, when the above structure has been removed from the main housing 51, then access can be had to the interior of the burner assembly by first removing screws 67 and then removing the enclosing hanger or inner pot 64.

Supported on the bottom of the main housing 51 at a position centrally thereof by means of a threaded mounting plug 96 is an intermediate pot member 97, spaced from the outer wall of the burner assembly and from the inner wall of the main housing, extending to a point below horizontal cover wall 54 and open all the way around to define a baffle for the flow thereover of the gaseous products from the cracking chamber 19.

The lower end of plug 96 is threadably mounted in housing main 51, being formed intermediate the ends thereof with a shoulder 98 for engaging pot member 97 about the periphery of an opening in the bottom thereof for holding the same against slotted supporting boss 99. Plug 96 is additionally threaded on the upper end thereof for attachment thereto of fuel spreader member 91. Suitable drain passages 101, 102 are formed in the bottom of the spreader and in the plug 96 for removing condensed liquid through an outlet 103. A similar drain opening 104 is provided in bottom member 69. Other arrangements for draining condensed liquid from the converter may be employed, the present form merely being illustrative, the important thing being that some provision must be made for such withdrawal. Likewise, the fuel spreader 91 may take other forms than that illustrated, so long as it presents a general dome or cone-like projection into the lower portion of the venturi. For example, the spreader 91 may be formed with steps or fins thereon to increase the area in which heat is applied to the oil in contact therewith.

In order to improve the introduction of the gaseous products of the converter into the charge forming assembly 12, there is provided in the right-hand portion of main housing 51 an upwardly extending tubular member 111, the inside of which member also serves as an important part of the charge forming assembly 12. A generally horizontal baffle 112 extends from a depending partition 113 in turn supported from a roof portion of housing 51. This baffle is arcuately recessed at 114 to partially embrace tubular member 111 in spaced relation thereto thus defining with the tubular member and housing 51 an annular shaped port for the passage of gases up along the outside of member 111 and uniformly over the upper end thereof for mixture with the proper ration of air in the charge forming passage 30. It will be noted that in effecting this result the bottom of arcuate recess 114 is more closely positioned to the adjacent side of tubular member 111 than is the corresponding opposite wall of housing 51 spaced from the adjacent side of tubular member 111. This is necessary since the gases are fed from the left in Figs. 1 and 2 and hence have a greater tendency to pass up the wall of tubular member 111 adjacent the bottom of arcuate recess 114.

*Detailed description of reservoir and distributor assembly*

The reservoir assembly 11 is mounted on the converter for an important reason in connection with the removal of oil and gasoline therefrom as will appear and is preferably a specially formed casting, including a reservoir main housing 121, and a cover 122 both members being extended to the right in Fig. 2 to form parts of the charge forming assembly 12 as will appear.

For the purpose of further insulating housing 121 from converter 10, the former is constructed so that it has a limited area of contact with the converter cover assembly 52. Housing wall 121 is made to converge generally downwardly to a first depending circular wall 123 complementary in diameter to vertical wall 58, and to a second depending circular wall 124 corresponding in position to passage 79 in wall 56. A plurality of bracing members 125 extend from housing 121 downwardly at an angle and are fastened to converter main housing 51 at radially spaced points about the periphery thereof by bolts 125a. This construction provides for the circulation of air between considerably more than fifty per cent. of the opposed areas of the converter cover assembly 52 and the housing 121. This circulation of air together with the circulation of air that takes place within the annular passages defined by walls 56 and 58 serves to amply protect the fuel reservoir assembly against excess heating as well as to additionally aid in preventing coking within the conduits 79 and 93 leading between the reservoirs and the converter by keeping down the temperature therein.

Distributor and change over assembly 22 (Figs. 1, 2, 9 and 10) for selectively removing oil from chamber 20 and gasoline from chamber 21 comprises a partition indicated generally at 126 separating the two reservoirs, and formed with a cylindrical chamber 127, receiving a rotatable tubular valve assembly indicated generally at 128. Partition 126 is formed with a port 129 for placing the valve assembly in communication with gasoline chamber 21 and with a second port 131 for placing the valve assembly in communication with oil chamber 20.

Valve 128 comprises a bearing bushing 132 in which there is positioned for arcuate adjustment a relatively thick walled tubular valve member 133, the lower end of which is open and rests upon a seal providing bearing member 134, of any suitable material such for example as that known commercially as Neoprene. Tubular member 133 is held against bearing member 134 by means of a compression spring 136 which engages at its lower end a cup-like retainer member 137 which in turn rests upon a shoulder formed on a reduced neck portion 138 of the tubular member, the upper end of the spring engaging the inside of a generally U-shaped drive connecting member 139 and holding it in engagement with a bearing washer 141 mounted against the underside of cover 122. Drive connecting member 139 is connected below cup member 137 to valve member 133 for turning the same, turning force being applied to U-member 139 through shaft 142, crank 143 and associated linkage to be described.

Tubular valve member 133 is constructed with a special arrangement of orifices to control the flow of oil and gasoline. In the position of valve 133 corresponding to the normal operation of the converter on oil and gasoline indicated in Figs. 1, 2, 9 and 10, a metering plug 144 allows gasoline to pass from chamber 21 to the interior of tubular valve 133. Extending upwardly within valve 133 and threadably attached to the housing wall 121 is a hollow nipple 146, in communication at its lower end with passage 79 and having a metering plug 147 threadably mounted in the upper end thereof and extending to a point slightly above the normal fuel level. The reduced neck portion 138 of valve 133 is provided with an air bleed plug 148 for admitting air into the interior of valve 133. It is important to note that the application of manifold suction is effective to cause the gasoline level within valve 133 to rise above the port in plug 147. When this happens, the fuel becomes emulsified with the air admitted by plug 148 and the resulting emulsion of gasoline and air is conducted through conduit 78 to the burners of the converter.

For removing oil to the converter in the position of valve 133 shown in Figs. 1, 2, 9 and 10, there is formed in the outer wall of the valve a chordal slot 149 serving to connect port 131 in the partition with the inlet passage 151 of a special arrangement indicated generally at 150 for emulsifying the oil and withdrawing the same to the cracking chamber 19. The bearing sleeve 132 is complementarily orificed with respect to passages 129, 131 and 151.

In a second position of valve 133, ordinarily referred to as the warm-up position, the valve is arranged to distribute gasoline only both to the burners and to the cracking chamber. Referring to Fig. 15, valve 133 has been turned to present a chordal passage 152 containing metering plug 153 and effective to conduct gasoline from chamber 21 to the inlet passage 151 of the emulsifying and removing assembly 150. A second passage 154 leads through the wall of valve 133 and contains metering plug 156, for admitting gasoline from chamber 21 to the inside of valve 133, with the valve in this position.

Figure 9:
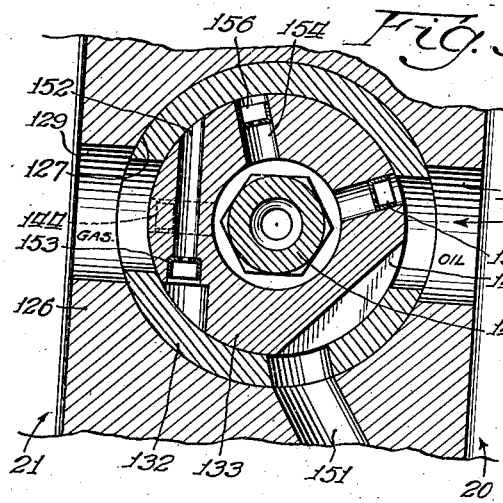
Fig. 9 is a broken away horizontal cross sectional view taken through the distributor valve and the associated sleeve with the valve in the position indicated at Figs. 1 and 2, showing to advantage the arrangement of passages for metering both gasoline and oil.

In addition to the above described metering passages formed in valve 133 there is an alternative arrangement providing for operating the burners on oil instead of gasoline after the device has been warmed up where such operation is desired. Referring to Fig. 9, this can be accomplished by interchanging the solid plug 157 for the metering plug 144.

Fuel emulsifying and removing assembly 150 includes an upstanding boss 161 formed with a passage 162 communicating at its lower end with conduit 93 and at the upper end with a chamber 163 formed in the upper portion of boss 161. Passage 151 also communicates at its upper end with chamber 163 through metering plug 164 at a point slightly above the normal fluid level. Chamber 163 has an air bleed plug 166 threadably mounted in the upper portion thereof. It is important to note that the air bleed opening in plug 166, as in the case of the air bleed in plug 148 functions to admit only a limited volume of air to thus cause in chamber 163 a partial vacuum when manifold suction is applied to the charge forming outlet with the result that fuel (oil or gasoline depending on the position of valve 133) is caused to rise through metering plug 164, is then mixed with the air and conducted through passage 161, conduits 93 and 92 to the conditioning or cracking chamber 19. The rate of removal of fluid varies with the degree of manifold vacuum.

Oil is admitted to chamber 20 through inlet connector 167, port 169, the flow through which is regulated by valve 171 under the control of float 172. Gasoline is admitted to chamber 21 through a similar arrangement including a strainer 173 and valve 174 under the control of float 176.

It is important to note that by virtue of the fact that the liquid levels in chambers 20 and 21 are maintained at about the same elevation, there is very little tendency for the two liquids to leak from one chamber to the other through the intervening distributor assembly 22.

The bowl is of the sealed or balanced type, to protect against changed calibration from changed air cleaner restriction, and to protect from dirt as well as to obviate a possible fire hazard as a result of a hot carburetor.

Air is admitted above the liquid level in chambers 20 and 21 through orifices 177, 178, 179 and 181 formed in the reservoir cover member 122.

In order to balance the air pressure to the sealed bowl to that within the main air inlet 31, the tubular member defining this inlet the same is extended to an elevation above the tubular extension 182 forming the air horn.

*Detailed description of the charge forming assembly*

The air supply for mixture with the gaseous products of the converter is admitted through the usual air filter (not shown) and thence through passage 31 under the control of valves 32, 33 and throttle 37.

Figure 11:
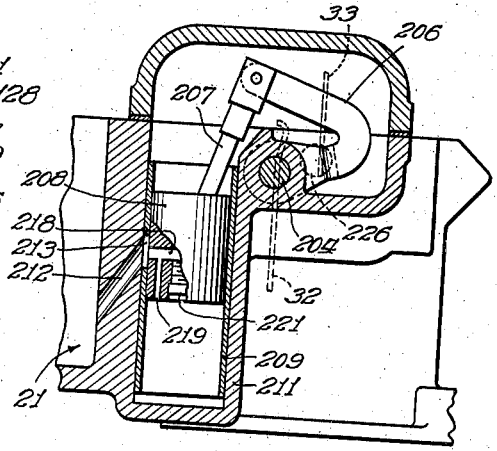
Fig. 11 is a broken away sectional view showing the dash pot control assembly for the air valve.
Figure 10:
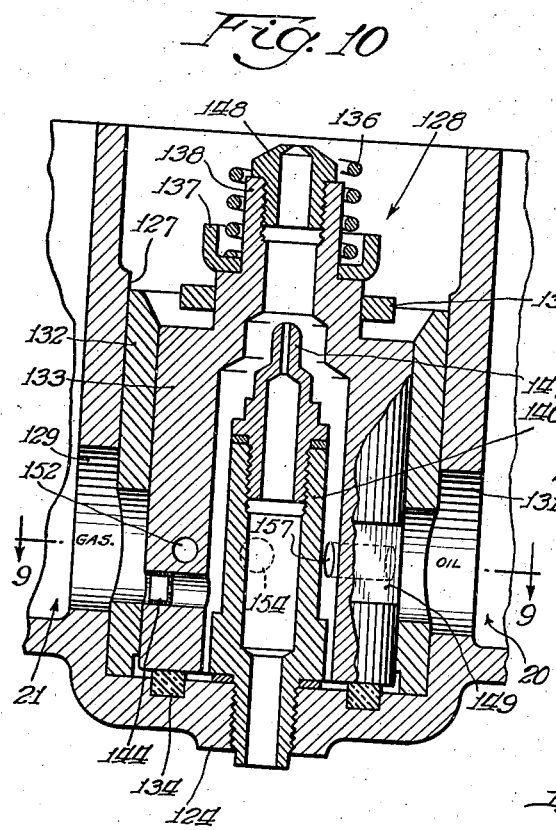
Fig. 10 is a vertical cross-sectional view of the change-over valve assembly shown in Figs. 1, 2 and 9.
Figure 12:
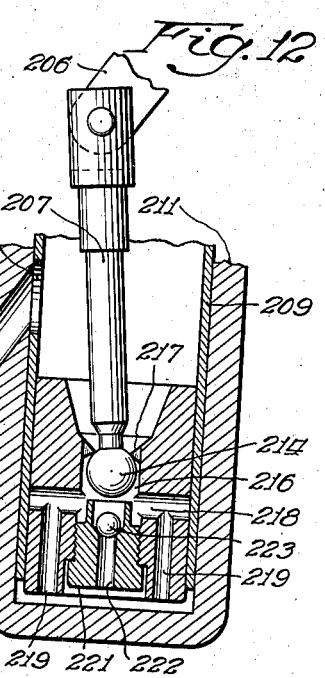
Fig. 12 is an enlarged vertical sectional view of a portion of the structure shown in Fig. 11.

Valve 32 is an automatic velocity controlled air valve which operates from the full line position of Fig. 2 at high velocity flow at part or full open throttle to a second partly closed position indicated in dotted lines when the throttle is in idling position. In this second position valve 32 rests against an idle stop pin 201 normally held in protruded position by a spring 202 retained in pin housing 203 threadably mounted in the side wall of housing 121. The second or idling position provides the required air for idling operation of the engine, but restricts the air flow sufficiently to maintain the necessary depression therebelow to cause the withdrawal of gases from the converter through port 36. For causing valve 32 to operate in this manner the same is eccentrically mounted on horizontal offset shaft 204, a special dash pot and lever arrangement being connected to this shaft. Referring particularly to Figs. 11 and 12, a crank 206 has one end non-rotatably mounted on the end of the shaft 204 and its other end pivotally connected to the outer end of a piston rod 207 carrying piston 208 operable in bearing sleeve 209 within dash pot cylinder 211. Gasoline from chamber 21 is supplied to the sleeve through passage 212 and complementary orifice 213 in sleeve 209. Piston 208 is pivotally attached to the lower end of rod 207 by a ball shaped portion 214 formed on the end of the rod, cooperating with a coaxial cylindrical passage 216, having splines 217 extending radially inwardly from the wall thereof above the ball portion 214 for retaining the same. Below passage 216 a communicating passage 218 joins with two longitudinally extending metering passages 219. The bore 216 below the transverse passage 218 is somewhat enlarged to receive a threaded plug 221, having a coaxial passage 222 therethrough, controlled by a one way ball check valve.

By making crank 206 in a general U-shape and fastening it to shaft 204 in the relation shown in Fig. 11 it is found that valve 32 is caused to move quickly toward the closing position in response to a drop in the velocity of flow thereby. The weight of piston 208 is sufficient to cause it to move downwardly in cylinder 211, the liquid therebelow being passed upwardly through metering passages 219 and 222 and 216, the valve 223 being caused to open by the force of liquid therebelow. The torque applied to shaft 204 has a predetermined value for any angular position of valve 32, the value of this torque being gradually increased as valve 32 is moved toward closed position and the effective movement arm of crank 206 is increased. The valve 32 comes to rest in a position where the forces acting thereon are balanced, or if the velocity of air thereby is insufficient to balance the weight of piston 208 in an intermediate position then valve 32 is brought to rest by contact with resilient stop 201.

When the velocity of air past valve 32 is again increased as by moving throttle 37 in the opening direction then premature opening of valve 32 is prevented by ball check valve 223 which closes and thus limits flow of liquid from above to below piston 208 by requiring it to pass through metering passages 219 only, with the result that the fuel charge is maintained sufficiently rich for supplying the power called for.

For furnishing the necessary choke in starting and warming up, a second valve 33 is pivotally supported on one edge on transverse shaft 226 centrally located adjacent shaft 204 in a manner such that when valve 33 is turned in the counter-clockwise direction in Fig. 1, it engages extension 32a of valve 32 and forces the opposite side against pin 201 causing the same to be forced into housing 203, thus permitting valves 32 and 33 to be moved to the choking position indicated in Fig. 13.

One end of choke valve shaft 226 extends through housing 121 and has a crank 227 carried thereby, which crank includes a roller 228 for engagement by a special arrangement of operating linkage later to be described for moving choke valve 33 from its normal vertical position to its operating position against the resistance of a spring 229 normally maintaining valve 33 in a vertical non-obstructing position.

Nozzle 34 for introducing an enriching charge of gasoline is placed in communication with float chamber 21 through passage 236, the outlet from which is under the control of a metering pin assembly 237. Metering pin assembly includes cylindrical metering pin 238 received in a tubular housing 239 vertically mounted in a cylindrical vertical passage 236. Metering pin 238 is formed at the lower end thereof with a reduced pin head like cylindrical metering portion 241 for cooperation with elongated metering orifice 242 formed in the lower end of housing 239. Metering pin 238 is further formed with a shoulder 243 for cooperation with valve seat 244 formed on the inside of housing 239 in communication with metering orifice 242 on the lower side thereof and in communication on the upper side thereof with transverse ports 246 which are in turn in communication with passage 236 leading from fuel bowl 21. Metering pin 238 has three positions of operation, a first position wherein shoulder 243 rests in closing relation on seat 244, thus shutting off completely the flow of gasoline from chamber 21 to nozzle 34 (see Fig. 2a); a second position wherein shoulder 243 is removed from its seat and metering pin head portion 241 is positioned intermediate the ends of passage 242 allowing a predetermined rate of flow of gasoline between it and the surrounding wall of passage 242 (see Figs. 1 and 2); and a third position wherein metering pin head 241 is completely removed above metering passage 242, thus allowing full capacity flow through this metering passage (see Fig. 13). As will appear from the description of operation, the first metering pin position is that occupied when the charge forming assembly is operating entirely on the gaseous products from the converter. The second position referred to is that occupied by the metering pin when an enriching charge is being supplied through nozzle 34 to further enrich the gaseous vapor delivered by the converter. The third position of metering pin 238 is that which it is made to assume when the device is operating entirely on gasoline as when warming up.

For the purpose of maintaining metering pin 238, in its first or completely closed position wherein there is no flow, there is provided a vacuum responsive piston 251 placed in communication with the mixture passage below throttle valve 37 to thus cause the piston to move downwardly against a spring 253 under predetermined conditions of vacuum existing below the throttle. Extending from the upper end of piston 251 is a stem 254 having a head 255 to which there is attached a link 256 in turn fastened to the upper end of metering pin 238 for causing the same to move with piston 251. The second position of metering pin 238 wherein metering head 241 controls the flow through passage 242 is determined by a pivotal stop 258 arranged to engage the upper end of piston 251 when the stop is in its lowered position shown in Fig. 2. Stop 258 is pivotally mounted on shaft 259 and is adjustable from the above position where it in turn engages a pin 261 to a second position where it engages the under side of head 255 of stem 254 for moving metering pin 238 to its above described third position wherein the flow through metering orifice 242 is unobstructed. The shaft 259 for adjusting stop 258 extends through housing 121 and carries on the outer end thereof a crank 262 including a pin 262a for cooperation with a special arrangement of control linkage for operating the same as will appear.

The Venturi sub-assembly 35 forming part of the charge forming assembly is supported between the adjacent portions of housing 51 and 121 by means of a radially extending flange 266 intermediate the ends of the venturi. The upper throat defining portion 267 is spaced radially from the surrounding portion of housing 121 and defines therewith an annular space for trapping gasoline that may condense or otherwise run down the inside wall from nozzle 34 and thus prevents inadvertent enrichment of the fuel charge under such circumstances. Such gasoline as collects within this trap is subsequently removed by vaporization in the normal operation of the device.

In order to eliminate the normal refrigerating effects due to the rapid rush of gases through the venturi and otherwise causing cold deposits there is provided a depending Venturi skirt 268, and a depending tubular member 269 in concentric but spaced relation to each other for defining an annular space therebetween. Tubular member 269 is preferably the same diameter as upstanding conduit 111, but spaced therefrom to define circular port 36 for the entry of gases from the converter. Venturi skirt portion 268 being maintained at an elevation above the lower end of tubular portion 269 and having the outer wall thereof spaced radially from the inner wall of the conduit member results in the gaseous vapors from the converter being drawn into port 36 without the usual cold deposits that have heretofore given considerable difficulty.

Throttle 37 is preferably positioned within a throttle body member 271 attached in any suitable manner, such as by bolts (not indicated) to housing 51, the throttle being mounted on a shaft 273 passing through the wall of the body member and provided with any one of the usual forms of linkage mechanism (not shown) for manually operating the throttle from a remote point, such for example as from the cab of a vehicle. To provide for the passage of the minimum amount of air and fuel required for idling when valve 37 is closed, a metering orifice 274 is formed therein. In order to maintain this orifice 274 clean and free from obstruction, a pin 275 is threadably mounted in the wall of the body 271 in such a position that when valve 37 is moved to the full open position, pin 275 passes through orifice 274 and thus removes any foreign obstruction that had adhered thereto.

Detailed description of control linkage

Figure 3:
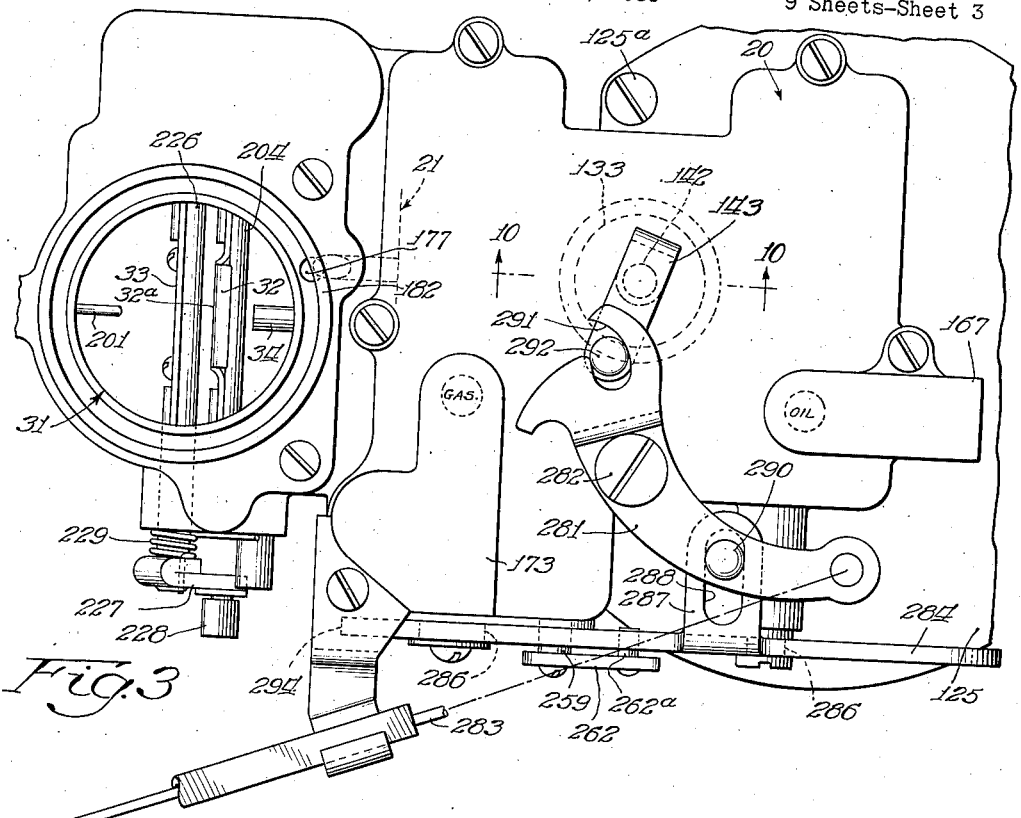
Fig. 3 is a plan view partially in section showing to advantage the relationship of oil and gas reservoirs, change-over valve and linkage mechanism for effecting this change-over.
Figure 4:
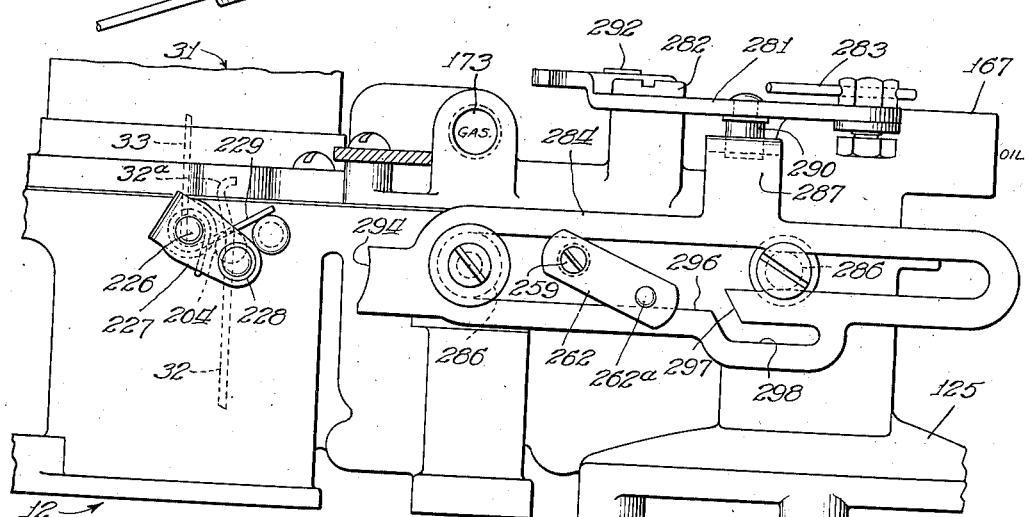
Fig. 4 is a partial side elevation showing to further advantage the linkage relationship of Fig. 3.

For interlocking and operating the various mechanisms in the proper sequence from a centrally located control member, there is provided a special arrangement of linkage indicated most clearly in Figs. 3 and 4.

This control linkage mechanism comprises a first horizontal lever 281 pivoted at 282 for arcuate movement having one end connected with crank 143 for adjusting valve member 133 and the other end thereof connected to a control wire 283 leading to the cab of the associated vehicle or other remote point for manually operating lever 281 therefrom, and a slide member 284 positioned for reciprocation on a pair of rollers 286 and connected by a horizontal transverse guide portion 287 to a pin 290 extending from lever 281 and guidably received in guide slot 288, the function of slide 284 being to control the operation of choke valve 33 and vacuum piston control stop 258. More specifically, an arcuate guide slot 291 is formed in the end of lever 281 for cooperation with a pin 292 forming part of crank 143 in such a manner that when lever 281 is turned about its pivot 282, pin 292 is made to follow in arcuate slot 291 and valve 133 is adjusted from one of its positions to the other. Likewise, pivotal movement of lever 281 causes pin 290 to move along transverse guide 288 and thus adjust slide 284 on roller 286. In the forward position of slide 284, the cam end portion 294 thereof engages roller 228 and causes choke valve 33 to engage the end of air valve 32 to move both valves into the choke position. When slide 284 has been moved forward a predetermined amount prior to the above described engagement with choke roller 228, the pin 262a drops below dwell portions 296 into cam guide 297, which causes crank 262 to turn in a counter-clockwise direction in Fig. 4, rotating shaft 259 and lifting vacuum piston 251 into its third or uppermost position, permitting full flow of gasoline through metering orifice 242. When pin 262a reaches the bottom of cam guide 297 it passes into a second dwell guide portion 298 providing for the maintenance of crank 262 in this arcuate position over a predetermined portion of the travel of slide 284 while cam 294 on the end of slide 284 is moving valves 32 and 33 into choke position.

Description of normal operation

Referring in particular to Figs. 1 and 2, the elements of the apparatus are indicated in the position they will occupy when normally operating on gasoline and converted oil. Valve 133 is arcuately adjusted to a position where gasoline from chamber 21 is admitted to the interior thereof through metering orifices 144 for delivery to the burners 86 as fuel, and presenting chordal slot 149 on the exterior thereof in position with relation to the port 131, and passage 151 for delivering oil from chamber 20 to the cracking chamber 19. The throttle 37 is in full open position and vacuum piston 251 has risen into engagement with stop 258 in which position an enriching charge is metered about metering head 241 in passage 242 to nozzle 34. The choke valve 33 is in its normal inoperative vertical position and air valve 32 is shown in the vertical plane corresponding to the position of throttle 37. However, valve 32 as will be seen, will vacillate about the shaft 204, depending upon the velocity and volume of flow through passage 31 as determined by the position of the throttle, the load on, and speed of the engine.

The gasoline within valve 133 is caused to rise to the level of the opening in metering plug 147 by manifold vacuum and is emulsified with the air drawn in through air bleed plug 148 and thence conducted downwardly through passage 79 in cover assembly 52, in conduit 81 of conduit assembly 78 and to a point below baffle plate 74. The air bleed to plug 148 functions upon cut-out of manifold suction to break the flow through plug 147, and thus prevent inadvertent syphoning of gasoline. The temperature of the emulsion passed downwardly through conduit assembly 78 is raised, but the degree thereof is kept below a critical or harmful value by virtue of the concentric spaced relationship between the conduits. Air entering port 57 passing downwardly through heater conduit 82, having the temperature thereof raised and is discharged into contact with the emulsion from tube 81, is mixed therewith and conducted up through elongated port 83 in baffle 74 whereupon it is divided and passed up through ports 84 in intermediate baffle 76 and uniformly delivered to the under side of the six burners 86. The burner fuel is, of course, additionally preheated by its contact with bottom or base member 69, which is subject to the hot gases or products of the converter chamber 19. The fuel mixture when it reaches the burners is, therefore, in a highly vaporized condition.

It is important to note that the fuel mixture delivered to the burners 86 is too rich for complete combustion, and is, therefore, augmented by a further supply of air to complete this combustion. A secondary supply of air is metered through port 59 under the control of threaded metering plug 61 in a measured amount more than sufficient to satisfy the complete combustion of the rich burner mixture. This secondary air is delivered through depending nipples 89 into intimate relation with the burner flame. The secondary air, admitted through port 59 thus becomes divided into two components indicated at $a$ and $b$ in Fig. 1. The first component $a$ is consumed in completing the combustion of the burner fuel to thus make possible the very high temperature within the flame chamber 15 of about 1500° F. The second component $b$ is heated to the approximate temperature of the flame chamber. The inert gases resulting from the complete combustion in the flame chamber together with the heated component of air $b$ are swept over the top of the burner venturi 73 and into the conditioning or cracking chamber 19.

Oil from the chamber 20 to be conditioned or cracked for producing fixed gases is caused to pass through port 131 past chordal slot 149 up through passage 151 and metering plug 164 into chamber 163 by virtue of the manifold depression imposed on passage 162, whereupon air passing through air bleed plug 166 becomes emulsified with the oil and the resultant mixture passes down through passage 162, the conduits 93 and 92, and into the conditioning or cracking chamber 19. This oil and air mixture from conduit 92 is brought into contact with the hot gases from the burner chamber including air component $b$. The component $b$ of air together with the air emulsified with the oil becomes effective to cause the burning of the lighter ends of the oil to additionally raise the temperature within conditioning or cracking chamber 19 to about 800° F. to 1300° F. This very high temperature results in cracking or otherwise conditioning the remaining heavy ends of the oil for carburetion. This conditioning or cracking operation produces what appears for all practical purposes to be a fixed gaseous product.

What happens when the fuel is prepared for carburetion in this manner is not definitely known, but any of a number of things might occur. It may be a simple cracking or destructive distillation of the fuel to form new, gaseous, molecular structures, probably including the ethylenes. There may be removal of certain parts of the fuel body by burning of the more readily combusible elements. There may be a considerable amount of chemical reaction of some of the constituents of air and of the burner oxidation with the oil to form new products without the formation directly of the simple combustion products of water and carbon dioxide. There is probably formed a considerable amount of CO and alcohols in firstly, the rich partial burning of the main fuel, and secondly, in a breakdown of simple $CO_2$ and $H_2O$, the original burner product by the reaction in mixture with hot oil gases.

In any event, applicants do not wish to confine themselves to any particular theory of operation. The important thing, so far as applicants' real contribution is concerned, is the fact that their structure, built as above described, and operated in the manner set forth, has proven to be eminently successful in actual practical use.

It is of great importance that there results a fuel which can be handled and carbureted as a gas, and which is burned in the engine as a greatly improved fuel from many standpoints, among them being that of detonation, reduced fouling of the engine's combustion chamber and spark plugs, reduced dilution of the engine oil, and continuous smooth delivery to the combustion chambers of the mixture proportioned as carbureted. The complete flexibility of gasoline carburetion is obtained in sustained idle as well as sustained high speed operation.

From the conditioning or cracking chamber 19, the gaseous products pass up between the outer open pot 97 and the inner pot or hanger member 64, over the top of the open pot 97, down between this pot and vertical baffle 113 of baffle 112 under the horizontal portion thereof, and up between the arcuate recess in baffle 112 and tubular member 111, and into port 36 of the forming assembly.

The fuel spreader 91 has been found to contribute definitely to the reaction taking place in cracking chamber 19, as this is attributed to the fact that it increases considerably the area against which the oil undergoing treatment may impinge and thus facilitate the heating thereof.

The hot gaseous products from the converter passing through port 36 thus become, under normal operating conditions, the main carburetion mixture, or the mixture. While port 36 is not at present a metering point, it can be made one at some future time if desired. The introduction of these gases between tubular members 111 and 269 out of direct contact with the cold skirt portion 268 of the venturi avoids the heretofore resulting cold deposits on the skirt of the venturi, with the consequent gradual reduction in the size of the inlet port, previously requiring periodic shut-down.

The annular orifice between the upper outer wall 267 of the Venturi and the surrounding housing 121, serves to trap gasoline running down the inside wall of the housing 121 from nozzle 34, sometimes resulting from throw-back of heat from the hot part of the carburetor after stopping. This trapped fuel is thereby withheld from falling into the manifold to cause hard hot restarting from excess richness. This fuel will of course be gradually evaporated into the main air, particularly after again starting.

Under the present assumed conditions of operation wherein the throttle valve 37 is fully open, the depression below the throttle to which line 252 is subjected will have dropped to a value where vacuum step-up piston 251 assumes the position indicated, whereupon gasoline is metered by pin 241 and delivered to nozzle 34, thus introducing raw gasoline into the air passing down through passage 31. The mixture resulting from the addition to the air of this raw gasoline is mixed with the gases admitted through port 36 and this becomes the fuel mixture, and will be called the full throttle mixture regardless of the exact throttle position at the time of its delivery.

The addition of this gasoline not only enriches the mixture, thus increasing the power, but has a pronounced anti-detonation value in the engine.

It is important to note that when the engine to which fuel is being supplied is operating at a predetermined fraction of full load part throttle the vacuum communicated through line 252 to piston 251 will be sufficiently high to maintain shoulder 243 of metering pin 238 against the valve seat 244, thus shutting off the flow of enriching gasoline to nozzle 34, and operation will be entirely on the gases admitted through port 36. Under normal operating conditions, the enriching nozzle 34 comes into use only when additional power is demanded.

*Warm up operation on gasoline*

In order to operate entirely on gasoline for warming up the present fuel supply device, when the temperature within the device is insufficient to permit carburetion of oil, it is merely necessary to shift the control linkage by pulling on control wire 283, thus causing lever 281 to pivot about its support 282 and turn change-over valve or distributor 133 to the position indicated in cross-section in Fig. 18, in which position gasoline is conducted through chordal passage 152 and metering plug 153 to chamber 163 of emulsifying and removing assembly 150, and hence through conduit 92 to the conditioning or cracking chamber 19 as well as delivering gasoline from chamber 21 through metering plug 156 to the interior of valve 133 for delivery to the burner 86 in a manner before described. The burner operation is initiated by means of spark plug 87.

It will be noted that metering plug 153 in passage 152 of valve 133 for metering gasoline directly to the cracking chamber for warm up necessarily has the port therethrough reduced in size in order to reduce the richness of the warm-up mixture, in compensation for additional gasoline through nozzle 34.

The forward movement of the slide 284 of the operating linkage mechanism results in first causing pin 262a to drop in cam guide 297, thus turning shaft 259 and raising adjustable stop 258 into contact with the head 255 of vacuum piston 251, and thus raising metering pin 238 completely out of metering position and allowing full capacity flow through metering passage 242 to nozzle 34, and in effect converting the charge forming assembly to a conventional carbureting device. In addition, the forward movement of slide 284, by further pull on control cable 144 is effective to bring cam surface 294 on the forward end of slide 284 into contact with roller 228 for rotating shaft 226 and effecting the closure of choke valve 33 and air valve 32 for producing the necessary choke. It will be noted that dwell guide 298 on slide 284 provides for maintaining metering pin 238 in its elevated position for operating the nozzle 34 as a carburetor nozzle after the valves 32 and 33 are permitted to again open following choking operation.

It will be noted in connection with the operation of air valve 32 that the opening movement of the same following release by the choke valve 33 is permitted to take place at a limited rate by virtue of check valve 223 in dash pot piston 208, which closes and forces the fuel to be displaced through metering orifices 219 as the piston is raised. Air valve 32 comes to rest when the pressure of air flow thereby balances the torque resistance of the weight of the piston 208 and associated parts. This torque resistance varies with the length of the moment arm through which the piston acts on shaft 204.

Starting, therefore, becomes similar to that of a normal carburetor, in that a large amount of restriction of the main air gives great enrichment, both through the withholding of this air and through greatly increased depression on the fuel system, here in particular the raw fuel enrichment system. This increased depression due to choke is of course translated to the converter fuel supply as well as to the main fuel system and the spark from spark plug 87 ignites the burner. As soon as the burner heat is applied to the gasoline main fuel which passes down through conduit 92 in the warm-up position of valve 133 the gasoline is vaporized and can therefore be carried through to passages before described to become a part of the main mixture. Likewise, the hot burner gases added to the enrichment fuel quickly raises its temperature to a point sufficient for distribution to the engine manifolding leading to the combustion chambers so that any further prolonging of choke is unnecessary. It can be seen that choke action is here necessary only to enrich the mixture sufficiently to enable the motor to fire, and can be completely suspended as soon as the burner begins to generate heat, which eliminates the warm-up period of the normal engine in which cold manifolding necessitates an extra rich mixture through choking in order to operate the engine. The metering pin 238, as above pointed out, remains in the enrichening position, due to the dwell guide portion 298 on the slide 284, until such time as the linkage mechanism is shifted sufficiently in the opposite direction to change the device back to normal oil and gasoline operation. The only warm-up period necessary after the engine is running and the burner has been ignited is that required to warm the charge forming passage, the burner chamber 15, and in the cracking chamber including the spreader 91 and the pot 97, in order to bring the parts to a temperature at which change-over to oil and gasoline can be effected without permitting partly treated oil to accumulate at the bottom of pot 97. The shut-off of the main fuel oil during warmup and the replacement thereof with gasoline permits application of a larger proportion of the burner heat to the metal parts, thus further shortening the warm-up period.

The burner gasoline supply during warm-up is metered and unchanged in exactly the same manner as in normal oil and gas feed operation, except that metering plug 156 is substituted for metering plug 144, of the same size which is made necessary by virtue of rotation of valve 133.

It is important to note that on full throttle mixture corresponding to normal oil and gasoline operation that only about one-seventh of the total fuel is raw gasoline flowing into the air stream through the enrichening nozzle 34. The quantity of raw gasoline that is caused to flow through metering port 242 when unrestricted by metering pin head 241 is increased about four times. This latter quantity taken alone amounts to about half the total fuel required to maintain a full throttle mixture ratio, the remainder coming from the converter which is also being supplied with gasoline through port 153 of valve 133 during warm-up separation.

It will thus be seen that the linkage mechanism provides an interlock preventing the improper sequence of operation of the present mechanism due to the human element. Thus, it is impossible to choke without first converting to gasoline operation, thus preventing inadvertent attempts to operate an oil when cold. The distributor valve 133 is interlocked through the linkage mechanism with the enriching supply device as well as with the air valve and choke valve, thus giving assurance of proper sequence of operation, whether on gasoline alone or on a combination of gasoline and oil. The control is simplified to a single button and starting instructions are only slightly more involved than for conventional hand choke gasoline carburetors.

While we have described our invention in connection with one specific embodiment thereof, it is to be understood that this is by way of illustration and not by way of limitation, and that the scope of our invention is to be defined solely by the appended claims which should be construed as broadly as the prior art will permit.

We claim:

1. In a heavy hydrocarbon oil heat converter assembly of the type forming part of an internal combustion engine fuel conditioning and charge forming device, means defining a burner chamber comprising a cover assembly, a combination hanger and burner enclosing housing, said housing being formed on the upper part thereof with a flange for attachment to said cover assembly and having the lower portion thereof turned radially inwardly to form a supporting flange, means defining a pre-assembled burner assembly formed complementarily to and arranged to be received in partially embraced and supported relation with respect to said last named flange, said burner assembly comprising an intermediate burner supporting housing of less vertical extent than said hanger member and being formed with a radially inwardly extending base portion of greater extent than said radially inwardly extending supporting flange portion of said hanger, said base portion terminating in a circular upturned flange, a Venturi member having the lower end thereof mounted within said flange, a plurality of vertically spaced baffle plates vested between said housing and said Venturi member, a plurality of burner members mounted in the upper one of said plates, tubular means extending downwardly through said baffle plates adapted to supply air and burner fuel between said base portion and the lowermost one of said baffle plates, said baffle plates being orificed in staggered relation whereby to define a circuitous path for the flow of air and fuel to the burners, said second burner housing fitting within said hanger member and engaging with said flange portion whereby to provide for ready assembly and disassembly.

2. In a fuel conditioning device for internal combustion engines including a heavy hydrocarbon oil converter having means defining a flame chamber assembly comprising a burner, conduit means passing substantially vertically through said flame chamber for conducting fuel to the lower inlet portion of said burner, said conduit means comprising a first outside conduit exposed to the heat within said chamber and a second conduit for conducting burner fuel therethrough, said second conduit being positioned concentrically with respect to said first conduit and having the outer wall thereof spaced from the inner wall of said first conduit, whereby to prevent coking of said fuel in that portion of said conduit located within said flame chamber.

3. In combination with a heavy hydrocarbon oil converter for conditioning the same for use as fuel in an internal combustion engine by partial combustion of the light ends of said oil in a limited supply of air including means defining a flame chamber and a gasifying chamber, including a Venturi member providing communication between said chambers, a reservoir adapted to receive heavy oil mounted on top of said converter and means for introducing said oil into said gasifying chamber from said reservoir comprising a depending tubular conduit extending from a point above the top of said flame chamber to a point within the said Venturi member, a second downwardly depending smaller tubular conduit in communication with said heavy fuel reservoir and extending into said first conduit in concentric spaced relation thereto but short of the top of said flame chamber.

4. In a fuel conditioning device for internal combustion engines of the type including in combination a heavy oil converter adapted to change the same into fixed gases capable of being mixed with air and used as fuel in the cylinders of an engine, said converter comprising an enclosing housing including a generally horizontal cover member therefor, means suspended from said cover member defining therewith a flame chamber assembly, said means including a first enclosing pot member, a base member embraced by said first pot and in turn supporting a centrally located Venturi member and radially disposed burner members, a second pot interposed between said flame chamber assembly and said first named enclosing housing, said second pot being particularly characterized by the fact that the upper wall of the same extends to a level short of the ceiling of said converter, the same being open all the way around the top thereof to define an unobstructed baffle wall for the flow of gases thereover, and means for supporting said second pot from the inner lower portion of said converter housing located adjacent the bottom central portion of said pot.

5. In a compact fuel forming device adapted for use in connection with an internal combustion engine and including in combination a converter for changing heavy hydrocarbon oils to a fixed gaseous form suitable for use in an internal combustion engine, a pair of fuel reservoirs mounted on top of said converter, a first one adapted to contain a relatively volatile fuel and a second one adapted to contain a relatively heavy hydrocarbon oil and means defining a mixing passage for mixing the products of said converter with air and adapted to conduct the same to an engine for consumption therein, said combination being particularly characterized by the provision of a cover casting for said converter on top of which is supported said fuel reservoirs, said casting having a bottom, generally horizontal wall, a closed annular wall extending upwardly therefrom, said annular wall being spaced inwardly of the periphery of said casting, a relatively thin, generally horizontal wall, a closed annular wall extending upwardly therefrom, said annular wall being spaced inwardly of the periphery of said casting, a relatively thin, generally horizontal sheet of insulating material received in contact with the upper periphery of said annular wall, a relatively thin metal plate received over said insulator cover, means defining a first passage through said horizontal wall located radially outwardly of said vertical annular wall for admitting a first stream of air to said converter, means defining a metering port in said annular vertical wall including an adjustable metering plug for admitting a predetermined volume of air therethrough, means defining a second passage through said horizontal wall located radially inwardly of said vertical wall for admitting said predetermined volume of airflow to the interior of said converter.

6. In a device for conditioning hydrocarbon oil for use in an internal combustion engine including a housing, means in said housing defining a gasifying zone, means in said housing defining a charge forming passage including an air inlet thereto, said last named means comprising an upwardly extending tubular member open at the upper end thereof and adapted to communicate at the lower end thereof with an internal combustion engine, means defining a conduit for conveying the gaseous products of said converter into said charge forming passage in a uniform evenly distributed manner, said last named means comprising a generally horizontal baffle, said baffle being particularly characterized by the formation of an arcuate recess therein, said baffle being disposed with said recess in partial embracing relation to said tubular member in the vicinity of the mid-portion thereof but spaced radially therefrom to define in cooperation with the surrounding housing an annular space for the passage of gases from the under side of said horizontal baffle up about the outside of said tubular member, substantially uniformly over the upper end thereof and downwardly therein for mixture with a stream of air from said inlet to form a fuel charge.

7. In a fuel conditioning and charge forming device including means defining a gasifying zone adapted to change heavy oil to a fixed gaseous form, means defining a mixing passage for mixing the products of the same with air to form a fuel charge adapted to be conducted to an internal combustion engine as fuel and including an upstanding tubular conduit open at the upper end thereof, a second tubular conduit corresponding in diameter positioned axially above said first named conduit and spaced therefrom to define a circular inlet port for the admission of fuel gases from said gasifying zone, said second named conduit being arranged to admit air for mixture with said fuel gases, said first named conduit being adapted to communicate at the lower end thereof with the inlet to an internal combustion engine, a throttle valve for controlling the discharge from said first named conduit, said arrangement being further particularly characterized by the provision of a Venturi member disposed coaxially within said second named conduit and including a depending skirt portion spaced radially inwardly from said second named conduit, said arrangement being effective to prevent cold deposits on said skirt due to the velocity of the gases.

8. In a fuel forming device including means for converting heavy oil to fixed gases and adapted to supply the same as fuel to an internal combustion engine comprising means defining a charge forming passage wherein the gaseous products of said converter are mixed with air and from which passage the resulting mixture is adapted to be delivered to an engine, said last named means including a first upstanding tubular conduit open at the upper end thereto and arranged at its lower end for communication with an engine intake, a throttle valve arranged to control the flow through said conduit, a second tubular conduit of substantially the same diameter as said first conduit positioned coaxially but spaced vertically above the upper end of said first named conduit and defining with said first named conduit a circular inlet port for gases from said converter, a Venturi member positioned in said second conduit, said Venturi member having a depending skirt portion spaced radially from said surrounding tubular member to define an annular spaced therebetween, the lower edge of said Venturi portion being spaced axially above the lower end of said second named conduit, said arrangement functioning to reduce the refrigerating effect on the lower edge of said Venturi skirt due to the rapid passage of gases thereby.

9. In an oil gasifying and charge forming device for an internal combustion engine including a converter for changing oil to fixed gases, means defining a charge forming passage including an air inlet port, a gas inlet port for admission of said gases spaced from said first port, air and choke valves located between said air inlet port and said gas inlet port, a throttle controlled discharge port for the resultant charge forming mixture, the combination therewith of a gasoline enrichening supply means, including a nozzle extending into said charge forming passage at a position between said air and choke valve and said inlet for the fixed gases, means for controlling the supply of gasoline to said nozzle for causing the same to be completely shut off under conditions where the vacuum below said throttle is above a predetermined minimum; for causing said nozzle under conditions of vacuum below said predetermined minimum to deliver a limited enrichening supply of gasoline to said charge forming passage and manually shiftable means for rendering said gasoline control means inoperative whereby to permit conventional carburetion flow from said nozzle, said shiftable means also being effective to close said air and choke valves for choking said device for the purpose of starting.

10. In an oil gasifying and charge forming device for an internal combustion engine including a converter for changing oil to fixed gases, said converter comprising means defining a burner zone and a gasifying zone, oil and gasoline supply means mounted on said converter defining a first reservoir for oil and a second reservoir for gasoline, said means including a distributor valve for selectively delivering gasoline to said burners and oil to said cracking chamber and effective by arcuate movement of the same to deliver gasoline both to said burners and to said gasifying chamber for the purpose of warming up said device, means defining a charge forming passage including an air inlet port, a gas inlet port for said gases spaced from said air inlet port and a throttle control discharge port for the resultant charge forming mixture, the combination therewith of means defining a velocity responsive air valve and an adjacent choke valve both adjacent said air inlet port, and a gasoline enrichening supply nozzle interposed between said air valve and said gas inlet port, means for controlling the flow of gasoline to said nozzle, said means including a vacuum responsive metering pin having three positions of operation; a first position wherein said metering pin is held in position to completely cut off the flow of gasoline to said nozzle in response to the vacuum below said throttle being above a predetermined value; a second or intermediate position into which said metering pin is urged by means of a spring when the vacuum below said throttle falls below a predetermined value, an adjustable stop means for defining said second position, and means for adjusting said stop to move said metering pin to a third position wherein it permits unobstructed flow through said nozzle, said last named means including a cam slide, said cam slide being further characterized by the provision of means thereon for maintaining said metering pin in said third position while said slide is being moved still further into contact with said choke valve for moving the same into contact with said air valve to close both of said valves for the purpose of effecting a choking action in starting said device and a pivoted lever connected to said slide and operable simultaneously therewith for adjusting said pivoted valve on said converter to deliver gasoline only both to said burners and to said cracking chamber.

11. In a device for converting heavy hydrocarbon fuel oil by partial burning in a limited air supply to a form suitable for use in an internal combustion engine including means defining a flame chamber and a gasifying chamber, said means comprising a Venturi member, an oil reservoir mounted above said flame chamber, and means adapted to respond to engine suction effective to withdraw fuel from said reservoir to said gasifying chamber, said means comprising means defining a chamber in said reservoir located above the normal fuel level therein, means defining a first conduit leading from below said normal fuel level and opening into said chamber, means defining a second conduit leading from said chamber downwardly to the throat of said Venturi member, and means defining an air bleed port in the upper portion of said chamber, said air bleed port being of limited cross-sectional area relative to the cross-section ones of said conduit leading to said chamber whereby said suction is effective to create a sufficient vacuum in said chamber to cause said fuel to rise therein, mix with said air, and discharge through said conduit means leading to said venturi and whereby said air bleed will break such discharge when said suction ceases to thus prevent syphoning.

12. In a fuel conditioning device for changing heavy oil to a fixed gaseous form including means defining a pair of reservoirs, means defining a converter, said reservoirs being mounted on said converter, the first of said reservoirs adapted to contain a heavy oil and the second of said reservoirs adapted to contain gasoline, the combination therewith of means for selectively delivering said oil and gasoline to said converter, said means being adapted to respond to engine intake vacuum and being unresponsive to syphoning effects when the engine with which it is adapted to be associated is not in operation, said arrangement comprising a partition between said two reservoirs, a vertically extending cylindrical chamber formed in said partition, a hollow cylindrical plug valve mounted in said vertically extending cylindrical chamber for arcuate adjustment therein, a hollow nipple member smaller than the interior of said plug extending from a port formed in the bottom of said chamber to a level slightly above the normal fluid level in said second reservoir, a metering port in said nipple above the normal fuel level, a radial metering passage between the wall of said plug in communication through complementary radial openings in said sleeve and the partition with the fluid in said second reservoir below the normal fuel level therein, said hollow plug valve having an air bleed in the upper portion thereof smaller than the port in said nipple whereby when suction is applied to the port in the bottom of said chamber fluid will be caused to rise and discharge downwardly through said nipple, said plug valve being formed on the exterior thereof with a chordal slot spaced peripherally from said radial metering passage, complementary inlet ports formed in the partition wall of said first named reservoir and in said sleeve communicating with said chordal slot, means defining a discharge passage leading from communication with said chordal slot, means defining a chamber in said first reservoir located above the normal fuel level therein, said discharge passage leading to said chamber, means defining a discharge passage leading from said chamber through a port in the bottom of said first named reservoir, said last named chamber being formed with an air bleed above the fuel level therein, whereby when suction is applied to said last named discharge passage oil is caused to rise within said chamber and discharge through said discharge passage, said plug valve being formed with a second set of passages effective when said valve is turned a predetermined amount to place both said nipple and said chamber in said first named reservoir in communication with the fuel in said second named reservoir below the normal level therein and to shut off flow from said first named reservoir.

DAVID FIRTH.
JOHN E. STORER, Jr.